US011969385B2

United States Patent
(12) United States Patent
Malmström et al.

(10) Patent No.: US 11,969,385 B2
(45) Date of Patent: Apr. 30, 2024

(54) SYSTEM AND MATTRESS FOR PREVENTING PRESSURE WOUNDS

(71) Applicant: CARE OF SWEDEN AB, Tranemo (SE)

(72) Inventors: Kenneth Malmström, Lycke (SE); Anton Järnhester, Tranemo (SE); Lars-Inge Magnusson, Hestra (SE)

( * ) Notice: Subject to any disclaimer, the term of this patent is extended or adjusted under 35 U.S.C. 154(b) by 0 days.

(21) Appl. No.: 16/652,709

(22) PCT Filed: Oct. 24, 2018

(86) PCT No.: PCT/SE2018/051087
§ 371 (c)(1),
(2) Date: Apr. 1, 2020

(87) PCT Pub. No.: WO2019/083436
PCT Pub. Date: May 2, 2019

(65) Prior Publication Data
US 2020/0289351 A1 Sep. 17, 2020

(30) Foreign Application Priority Data
Oct. 27, 2017 (SE) .................................. 1751336-7

(51) Int. Cl.
*A61G 7/057* (2006.01)
*A47C 27/08* (2006.01)
*A47C 27/10* (2006.01)

(52) U.S. Cl.
CPC ........ *A61G 7/05776* (2013.01); *A47C 27/082* (2013.01); *A47C 27/10* (2013.01); *A61G 2205/60* (2013.01)

(58) Field of Classification Search
CPC ............ A61G 7/05776; A61G 7/05769; A61G 2205/60; A47C 27/081; A47C 27/082; A47C 27/10
(Continued)

(56) References Cited

U.S. PATENT DOCUMENTS 5,152,319 A * 10/1992 Hannagan .......... A61G 7/05776 137/102
5,584,084 A * 12/1996 Klearman .......... A61G 7/05769 403/349
(Continued)

FOREIGN PATENT DOCUMENTS

CN 1274409 A 11/2000
EP 0823248 A2 * 2/1998 ......... A61G 7/05776
(Continued)

OTHER PUBLICATIONS

Independently, definition: https://dictionary.cambridge.org/us/dictionary/english/independently.*
(Continued)

*Primary Examiner* — David R Hare

(74) *Attorney, Agent, or Firm* — Flener IP & Business Law; Zareefa B. Flener

(57) ABSTRACT

The present invention relates to a system (100) for preventing pressure wounds. The system (100) comprises a pump (4) for supplying or evacuating air to or from a mattress (2). The mattress (2) comprises at least two air channel systems (8) and a hose (6). The hose (6) comprises a connector unit (10) at the distal end for connecting the mattress (2) to a receiving unit (12) provided on the pump (4). The connector unit (10) is provided with an information carrier (54) carrying information, which is readable by the pump (4), for operating the at least two channel systems (8) independently of each other.

14 Claims, 3 Drawing Sheets

Fig. 5

(58) Field of Classification Search
USPC .............................................................. 5/710
See application file for complete search history.

(56) References Cited

U.S. PATENT DOCUMENTS

| | | | | |
|---|---|---|---|---|
| 5,647,079 | A * | 7/1997 | Hakamiun | A61G 7/05776 285/124.3 |
| 5,904,172 | A * | 5/1999 | Gifft | A47C 27/082 137/224 |
| 6,253,402 | B1 * | 7/2001 | Lin | A61G 7/001 137/625.21 |
| 6,735,799 | B1 * | 5/2004 | Ellis | A61G 7/05776 5/713 |
| 7,784,131 | B2 * | 8/2010 | Genaro | A61G 7/05776 5/713 |
| 8,156,589 | B2 * | 4/2012 | Liu | A47C 27/082 5/713 |
| 9,504,620 | B2 * | 11/2016 | Soltani | A61G 7/05769 |
| 10,741,103 | B2 * | 8/2020 | Danielson | G09F 3/0335 |
| 2008/0181795 | A1 * | 7/2008 | Feingold | F04B 39/123 417/282 |
| 2009/0009290 | A1 | 1/2009 | Kneip et al. | |
| 2013/0014324 | A1 * | 1/2013 | Receveur | A61G 7/05769 5/691 |
| 2014/0101861 | A1 * | 4/2014 | Gowda | A47C 27/082 5/709 |
| 2016/0317370 | A1 * | 11/2016 | Evans | A61G 5/1091 |
| 2017/0089496 | A1 * | 3/2017 | Lennon | F16L 13/146 |
| 2019/0151175 | A1 * | 5/2019 | Kelch | A47C 27/082 |

FOREIGN PATENT DOCUMENTS

| | | | |
|---|---|---|---|
| EP | 0823248 | A2 | 11/1998 |
| EP | 1017941 | A | 2/2000 |

OTHER PUBLICATIONS

International Search Report, International application No. PCT/SE2018/051087, dated May 2, 2019, Care of Sweden AB.
Written Opinion of the International Searching Authority, International application No. PCT/SE2018/051087, dated May 2, 2019, Care of Sweden AB.
National Intellectual Property Administration, PRC, First Office Action, dated Jan. 5, 2021, System and Mattress for Preventing Pressure Wounds, Application No. CN201880065781.98.

* cited by examiner

SYSTEM AND MATTRESS FOR PREVENTING PRESSURE WOUNDS

TECHNICAL FIELD

The present invention generally relates to a system for preventing pressure wounds. More specifically the present invention relates to a system in which a pump in the system recognizes which mattress that is connected thereto and operates the pump accordingly. The present invention also relates to a mattress configured to operate in the system.

BACKGROUND ART

Pressure ulcers, also known as pressure sores, bedsores and pressure wounds, are localized damage to the skin and/or underlying tissue that usually occur over a bony part of a person as a result of pressure. Pressure wounds may also be caused by pressure in combination with shear and/or friction. Pressure wounds are most common among persons with low movability, i.e. persons that are unable to switch position when for instance lying in a bed or are confined to a wheelchair.

The rate of pressure wounds in European hospitals is high and range from about 8% to 23% depending on country. The primary prevention of pressure wounds is accomplished by redistributing pressure by regularly turning the person. Nursing homes and hospitals usually set programs in place to avoid the development of pressure wounds for those patients that are bedridden. This may include using a routine time frame for turning and repositioning a patient to reduce pressure. The frequency of turning and repositioning depends on the patient's level of risk. However, such programs will increase the work load of the staff working at the hospital or the like.

Another way of redistributing pressure is to use pressure redistribution mattresses. Such mattresses, which are becoming more and more popular, are connected to a pump that is capable of supplying and evacuating air to or from the mattress. Pressure redistribution mattresses may contain multiple air chambers that are alternately pumped. In such a way, the pressure may be varied and thus the pressure wounds may be avoided.

US 2010/000020 discloses a therapeutic mattress system for treating a patient. The mattress system has a mattress with a plurality of vertically elongated cells extending from a base layer that are arranged in a row and column grid arrangement. The elongated cells are further grouped into a first group of cells and a second group of cells that are fluidly interconnected to define two separate groups of chambers. The cells of the first group alternate with the cells of the second group diagonally across the mattress. Each of the grouping of cells has an inlet port and an exit port. A blower assembly is also provided to provide and exhaust air from the respective air chambers and may be operated in different modes, such as a standard, alternating pressure, rotation, wound therapy, percussion or vibration mode. The blower or pump is adapted to the mattress and will only pair up with a specific mattress. Thus, if the number of specific mattresses increases so will the number of pumps, and thus there might be problems with connecting the right mattress to the corresponding pump. This may at the end be a safety hazard.

EP 1 017 941 discloses an identification and communication system for inflatable devices, especially for a compression garment. The pressure garment comprises one air chamber into which air may be supplied or from which air may be evacuated. EP 1 017 941 also discloses connection means for connecting the inflatable device to a pump. The connection means comprise communication means which may comprise information, transmitted to the pump, used to identify the inflatable device and thereafter to control the pump operation. The pump operation is directed towards intermittent compression therapy and pressure area care.

Thus, there is a need for an improved system for supplying air to a mattress for preventing pressure wounds, in which system one pump is capable of operating different types of mattresses.

SUMMARY OF INVENTION

An object of the present invention is to accomplish a system for preventing pressure wounds. The system comprises a pump for supplying or evacuating air to or from the mattress and the mattress comprises at least two air channel systems and a hose. The hose comprises a connector unit at the distal end for connecting the mattress to a receiving unit provided on the pump. The connector unit is provided with an information carrier carrying information, which is readable by the pump, for operating the at least two channel systems independently of each other.

In preferred embodiments, the information carrier may be a Radio Frequency Identification, RFID, tag, or a Near Field Communication, NFC, tag readable by a corresponding reader provided in the pump.

Furthermore, wherein the connector unit may be provided with a protrusion adapted to mate with a corresponding cut-in-portion in the receiving unit, in order to mechanically identify the mattress.

In other embodiments, the system may comprise a mattress with two independent air channel systems or a mattress with four independent air channel systems.

In yet another embodiment of the system the connector unit comprises a lid that closes the connector unit air tight when the connector unit is in a disconnected state.

Another object of the present invention is to accomplish a mattress for preventing pressure wounds. The mattress comprises at least two air channel systems, which are configured to receive air from and evacuate air to a pump. The mattress also comprises a hose having a connector unit at the distal end for connecting the mattress to a receiving unit provided on the pump. The connector unit is provided with an information carrier carrying information, readable by the pump, wherein the at least two channel systems, during use, are operable by the pump independently of each other.

In preferred embodiments of the mattress, the information carrier is a Radio Frequency Identification, RFID, tag or a Near Field Communication, NFC, tag, readable by a reader provided in the pump.

The mattress may also comprise a connector unit with a protrusion adapted to mate with a corresponding cut-in-portion in the receiving unit of the pump.

Preferably the mattress comprises two, three or four independent air channel systems.

In a preferred embodiment connector unit of the mattress comprises a lid that closes or seals the connector unit air tight when the connector unit is in a disconnected state.

Thus, by using more than one channel system, wherein each channel system may be operated independently of each other and wherein the operation mode is determined by the information carrier it is not only possible to prevent pressure wounds, but it is also possible to use the same pump together with a wide variety of mattresses. Advantageously, the connector unit may also be provided with a protrusion adapted to mate with a corresponding cut-in-portion in the receiving unit of the pump. This may for example mate a group of mattresses to a specific pump to which they are connectable to, whereas other pumps will not be connectable at all to this group of mattresses.

BRIEF DESCRIPTION OF DRAWINGS

The invention is now described, by way of example, with reference to the accompanying drawings, in which.

DESCRIPTION OF EMBODIMENTS

Figure 1:
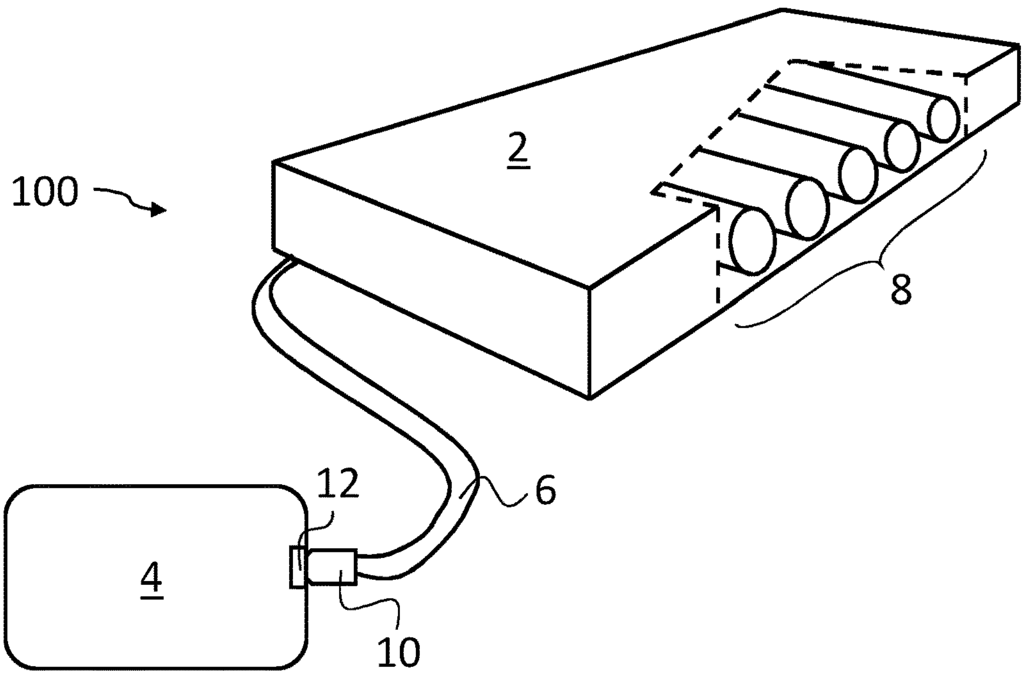
FIG. 1 is a schematic view of a system for supplying air to a mattress for preventing pressure wounds.

In the following, a detailed description of a system 100 for preventing pressure wounds will be made. The system 100 is schematically shown in FIG. 1 and comprises a mattress 2 that is connected to a pump 4. The mattress 2 comprises two a more independent air channel systems 8, which will be closer described in conjunction with FIG. 3 and FIG. 4. Basically, each air channel system 8 is individually operable by the pump 4, i.e. independently of each other. For example, a first air channel may be filled with air while a second air channel system may be evacuated from air. Thus, there is no interconnection between the different air channel systems 8.

The mattress 2 also comprises a hose 6 for connecting the mattress 2 to the pump 4. The different air channel systems 8, which are provided in the mattress 2, each enter the hose 6 at one end of the mattress 2 and extend to a distal end of the hose 6 where a connector unit 10 is provided. The hose 6, the connector unit 10 and the air channel systems 8 are all part of the mattress 2 for preventing pressure wounds.

The connector unit 10 connects the mattress 2 and the different air channel systems 8 to the pump 4 and comprises an information carrier 54 (not shown in FIG. 1). The connector unit 10 and the information carrier will be described closer described in conjunction with FIG. 5 to FIG. 7.

Figure 2:
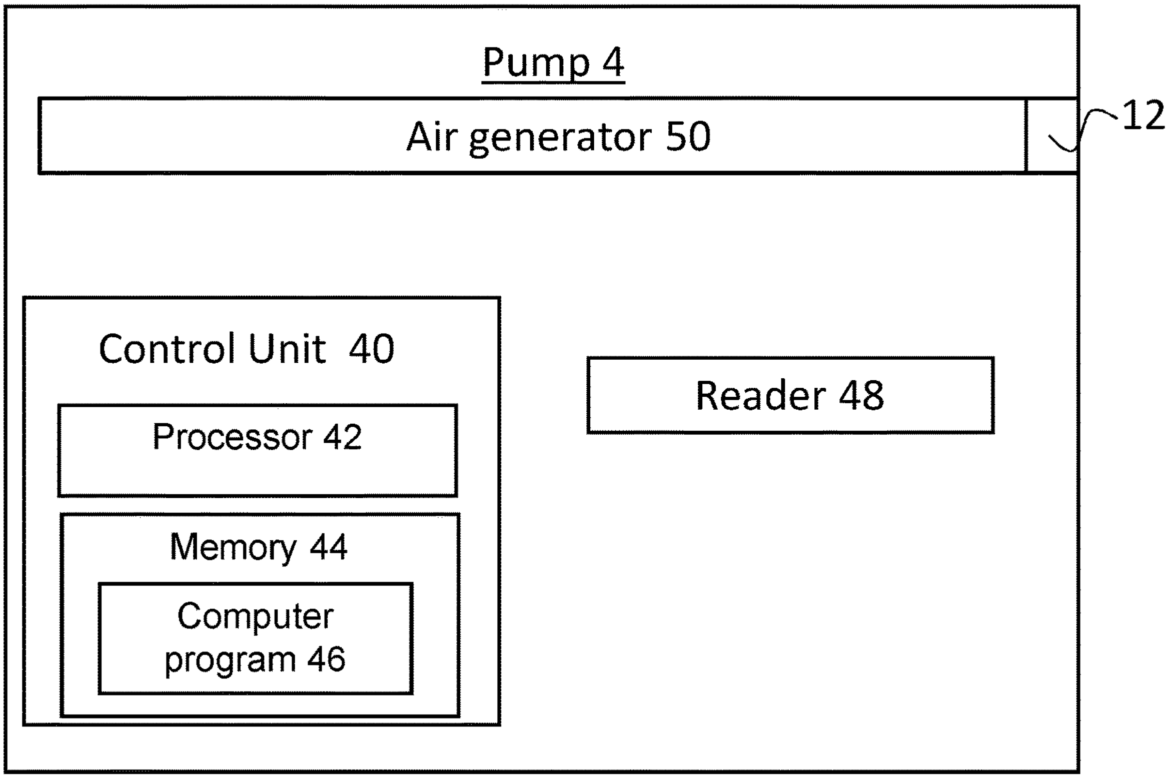
FIG. 2 is a block diagram schematically illustrating different parts of a pump in the system.

Turning now to FIG. 2 the pump 4 of the system 100 will be described. The pump 4 comprises a receiving unit 12, which is adapted to receive the connector unit 10. For example, the receiving unit 12 may be configured as a female connector and the connector unit 10 as a male connector or vice versa. What is important is that the connection that is created by the connector unit 10 and the receiving unit 12 connects the air channel systems 8 of the mattress 2 to the pump 4 in an air-tight manner. How an air-tight connection is designed is believed to be within the scope of a person skilled in the art and will therefore not be discussed any further here.

The pump 4 further comprises an air generator, a control unit 40 and a reader 48 for reading the information carrier 54 provided in the connector unit 10. The air generator 50 may comprise compressors, air valves etc. for generating air and supplying or evacuating air to or from the air channel systems 8 of the mattress 2. The control unit 40 comprises a processor 42 and a memory 44. The memory 44 may comprise a computer program 46 or code for controlling the air generator 50 in response to the information obtained by the reader 48, which reads the information carrier 54 provided in the connector unit 10. The obtained information may relate do different operating parameters, such as type of mattress 2, number of air channel systems 8, maximal air pressure in an air channel system 8 and pressure cycle times, but are not limited to these operating parameters. The information carrier 54 may also carry program code, which is read by the reader 48 and executed by the processor 42 of the control unit 40. Thus, in context of the present description the information provided by the information carrier 54 is to be interpreted broadly including both operating parameters and program code.

The reader 48 is adapted to the type of information carrier 54 that is provided in the connector unit 10. In one exemplary embodiment, the information carrier 54 may be a Radio Frequency Identification, RFID, tag, which is readable by a RFID reader 48. In another exemplary embodiment, the information carrier 54 may be a Near Field Communication, NFC, tag, which is readable by a NFC reader 48. There are many different technologies that may be used to transfer information from an information carrier 54 to a reader 48 and it is believed to be within the scope of a person skilled in the art to choose an adequate technology.

Figure 3:
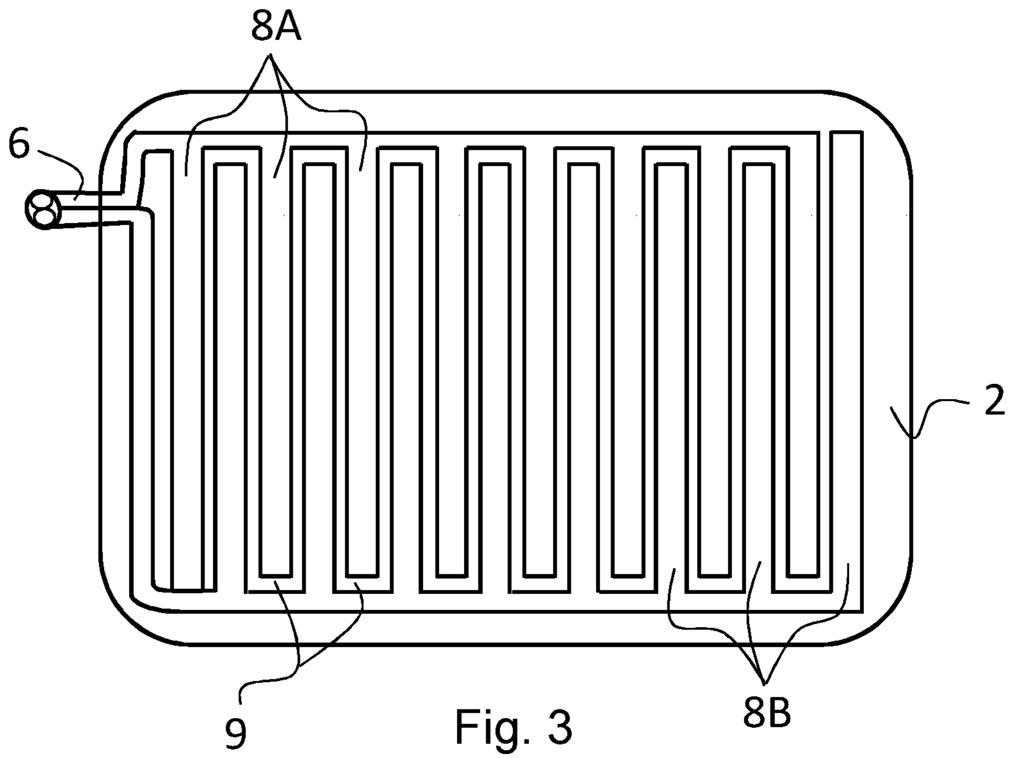
FIG. 3 is a schematic view of a mattress comprising two independent air channel systems.

With reference to FIG. 3 a mattress 2 with two different air channel systems 8A and 8B will be described. As is evident in FIG. 3 the two air channel systems 8A and 8B are separated, i.e. they are not interconnected and thus operable individually and separately by the pump 4. In FIG. 3 the hose 6 has been cut such that the tubes of the two air channel systems 8A and 8B are uncovered. In the configuration of the mattress 2 in FIG. 3, the two different air channel systems 8A and 8B are separated by a wall or channel 9. This channel 9 may be filled with air or consist of reinforcement ribs or the like. The thickness of the wall 9 is a design option. In one exemplary embodiment, it would be possible to use this channel 9 as a third air channel system that also is connected to the pump 4.

Figure 4:
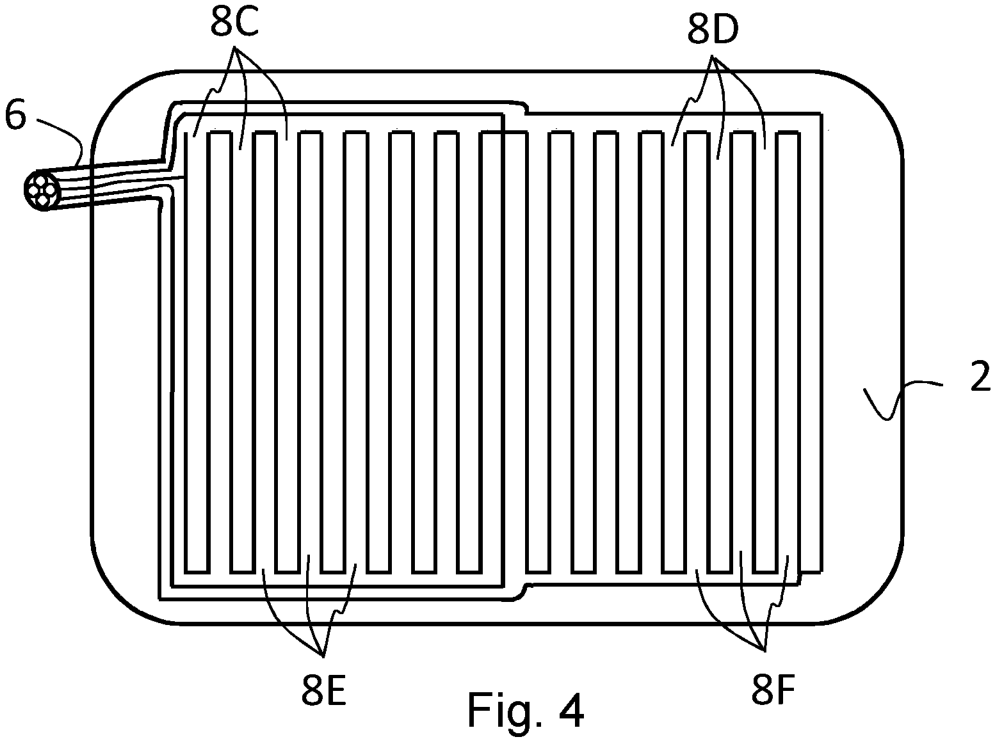
FIG. 4 is a schematic view of a mattress comprising four independent air channel systems.

With reference to FIG. 4 another mattress 2 with four different air channel systems 8C, 8D, 8E and 8F will be described. The two air channel systems 8C and 8E are covering one half of the mattress 2, i.e. the half that is closer to the hose 6. The two other air channel systems 8D and 8F cover the other half of the mattress 2. As is evident in FIG. 4 all four air channel systems 8C, 8D, 8E and 8F are separated, i.e. they are not interconnected and thus operable individually and separately by the pump 4. Also in FIG. 4 the hose 6 has been cut such that the air channel systems 8C, 8D, 8E and 8F are uncovered.

As is evident by studying FIG. 3 and FIG. 4 there are a many different design options when it comes to designing the different air channel systems 8 in a mattress 2. The different air channel systems 8 may be alternating or provided at different parts of the mattress, such as to control a dedicated part of the mattress 2, for example under the head or seat. The different designs of the mattress 2 enable tailor making of the preventive care in order to avoid pressure wounds. One problem that this has caused in prior art is that different mattresses 2 often required different pumps in order to function. Sometimes a pump could be used to several mattresses, with the problem that the personnel operating the system had to select the appropriate program for the mattress. This could sometimes lead to inadequate use and shorten the useful life of the mattress.

One of the advantages with the present invention is that different mattresses may be used with the same pump, without the risk of operating the mattress in a wrong way. The reason is that when one connects the connector unit 10 to the pump 4 the information carrier 54 is read by the reader 48 and the information is then used by the control unit 40 of the pump 4 to control the air generator 50 and thus the pressure in the different air channel systems 8 of the pump. There are many different regimes that may be used when controlling pressure in the air channel systems 8. For example, one air channel system 8A may be filled with air, while another air channel system 8B may be evacuated from air. This will prevent pressure wounds as the pressure will vary over time at different parts of the mattress 2. There are also other regimes, such as varying the pressure at a special location of the mattress 2 or filling two different air channels systems 8 with air, while evacuating a third air channel system from air etc.

Figure 5:
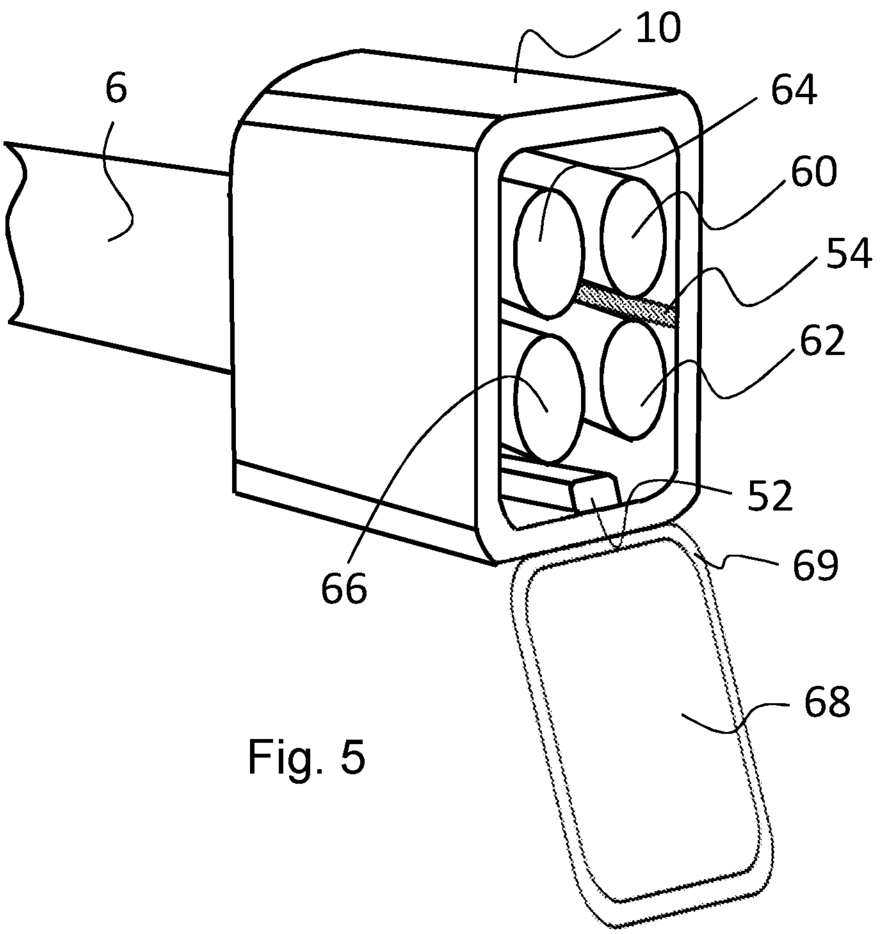
FIG. 5 is a schematic perspective view of a connector unit.

Turning now to FIG. 5 the connector unit 10 at the distal end of the hose 6 will be closer described. In the exemplary embodiment of FIG. 5 the connector unit 10 carries four tubes 60, 62, 64 and 66 which each belong to a separate air channel system 8. The connector unit 10 is provided with a lid 68, which when closed seals the connecter unit 10 such that the air that is in the air channel systems 8 of the mattress 2 is kept in the mattress 2 when the hose 6 is disconnected. In an exemplary embodiment, the lid 69 is spring-biased such that the lid 69 "snaps" to a closed position. In this position of the lid 69, there may also be some kind of locking means into which the lid snaps such as it seals the connector unit 10. Preferably the connector unit 10 or as shown in FIG. 5 the lid 68 is provided with a gasket 69 or the like.

As mentioned above the connector unit 10 also comprises an information carrier 54, which carries information about the mattress 2 to which the connector unit belongs. The information carrier may be a RFID, NFC or any other suitable tag that is readable by a reader 48 in the pump 4 and capable of carrying information about operating parameters for a specific mattress. The operating parameters may not be previously known to the control unit 40 of the pump. Thus, with the present invention it is also possible to connected a new mattress 2 to the pump 4, i.e. a mattress 2 that has been developed after the pump 4 has been put in service. This will substantially reduce the number of pumps 4 required for the preventive care of avoiding pressure wounds. This, is of course also cost saving and safer since the system will work automatically and there is no risk that nursing staff operates the mattress 2 in a wrong way. The information carrier 54 may be placed anywhere in the connector unit 10 as long as it is readable by the reader 48 in the pump 4.

FIG. 5 further shows that the connector unit 10 is provided with a protrusion 52. The protrusion 52 is adapted to mate with a corresponding cut-in-portion (not shown in the figures) in the receiving unit 12. The protrusion 52 and the corresponding cut-in portion are used to mechanically identify a group of mattresses operable by the pump 4. All mattresses 2 in a group operable by the same pump 4 have same type of protrusion 52, or it may also be several protrusions, that mate the receiving unit 12 of the pump 4, which is shown in more detail in FIG. 6 and FIG. 7.

Figure 6:
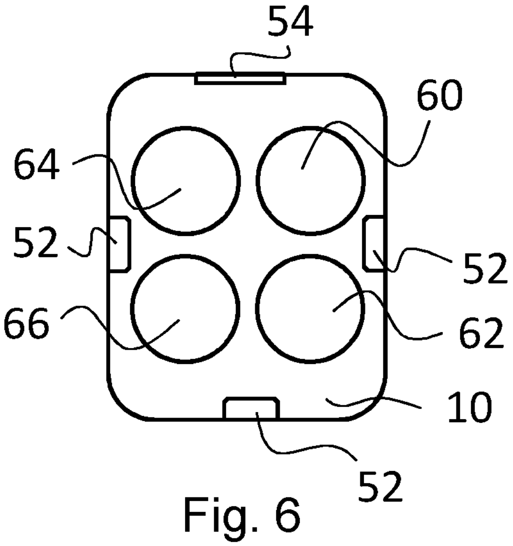
FIG. 6 is a schematic front view of an embodiment of the connector unit.

FIG. 6 is an exemplary embodiment of another connector unit 10. As the connector unit 10 in FIG. 5 the connector unit 10 in FIG. 6 carries four tubes 60, 62, 64 and 66 which each belong to a separate air channel system 8. The difference compared to FIG. 5 is that in FIG. 6 there is provided three protrusions 52 and the information carrier 54 is placed in the top of the connector unit 10 instead of the side of the connector unit 10. The protrusions 52 are substantially rectangular in shape, but may have any arbitrary shape as long as there is a corresponding mating cut-in portion on the receiving unit 12 of the pump 4.

Figure 7:
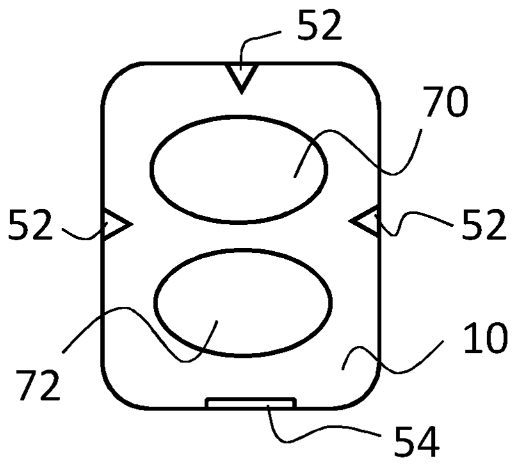
FIG. 7 is a schematic front view of another embodiment of the connector unit.

FIG. 7 is another exemplary embodiment of the connector unit 10, this time carrying two tubes 70 and 72, each belonging to a separate air channel system 8. This embodiment of the connector unit 10 also comprises protrusions 52, but they are shaped differently compared to the protrusions previously disclosed. In FIG. 7 the protrusions 52 are substantially triangular in shape. The connector unit 10 in FIG. 7 also comprises an information carrier 54, but now provided in the bottom of the connector unit 10.

Although, the present invention has been described above with reference to specific embodiments, it is not intended to be limited to the specific form set forth herein. Rather, the invention is limited only by the accompanying claims. For example, the number of independent air channel systems may be other than the two described examples of two and four. Also, three, five, six our more air channels may be used, which are operated independently from each other by the pump. The information carrier 54, may not only be a RFID or NFC tag, but could also be a memory card in the connector unit that is electromechanically coupled to the pump 4.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A system for preventing pressure wounds, said system comprising:

a mattress (2);

a pump (4) for supplying or evacuating air to or from the mattress (2);

wherein the mattress (2) comprises at least two air channel systems (8) and an integrally attached hose (6);

said hose (6) comprising a connector unit (10) at the distal end that is directly connected to a receiving unit (12) provided on the pump (4);

said connector unit (10) being provided with an information carrier (54) carrying information comprising operating parameters specific to the mattress (2), wherein the information is readable by the pump (4), for operating the at least two air channel systems (8) of the mattress (2) independently of each other.

2. The system according to claim 1, wherein the information carrier (54) is a Radio Frequency Identification, RFID, tag, readable by a RFID reader (48) provided in the pump (4).

3. The system according to claim 1, wherein the information carrier (54) is a Near Field Communication, NFC, tag, readable by a NFC reader (48) provided in the pump (4).

4. The system according to claim 1, wherein the connector unit (10) is provided with a protrusion (52) adapted to mate with a corresponding cut-in-portion in the receiving unit (12).

5. The system according to claim 1, wherein the mattress comprises two independent air channel systems (8A, 8B).

6. The system according to claim 1, wherein the mattress comprises four independent air channel systems (8C, 8D, 8E, 8F).

7. The system according to claim 1, wherein the connector unit (10) comprises a lid (68) that closes the connector unit (10) air tight when the connector unit (10) is in a disconnected state.

8. A mattress (2) for preventing pressure wounds, the mattress (2) comprising:

at least two air channel systems (8), which are configured to receive air from and evacuate air to a pump (4);

an integrally attached hose (6) comprising a connector unit (10) at the distal end that is directly connected to a receiving unit (12) provided on the pump (4);

said connector unit (10) being provided with an information carrier (54) carrying information comprising operating parameters specific to the mattress (2), wherein the information is readable by the pump (4), wherein the at least two air channel systems (8), during use, are operable independently of each other.

9. The mattress (2) according to claim 8, wherein the information carrier (54) is a Radio Frequency Identification, RFID, tag, readable by a RFID reader (48) provided in the pump (4).

10. The mattress (2) according to claim 8, wherein the information carrier (54) is a Near Field Communication, NFC, tag, readable by a NFC reader (48) provided in the pump (4).

11. The mattress (2) according to claim 8, wherein the connector unit (10) is provided with a protrusion (52) adapted to mate with a corresponding cut-in-portion in the receiving unit (12) of the pump (4).

12. The mattress (2) according to claim 8, wherein the mattress comprises two independent air channel systems (8A, 8B).

13. The mattress (2) according to claim 8, wherein the mattress comprises four independent air channel systems (8C, 8D, 8E, 8F).

14. The mattress (2) according to claim 8, wherein the connector unit (10) comprises a lid (68) that closes the connector unit (10) air tight when the connector unit (10) is in a disconnected state.

* * * * *